3,094,544
Patented June 18, 1963

3,094,544
MOLYBDENUM BENZOPHENONE COMPOUNDS
Melvin L. Larson, Royal Oak, Mich., assignor to American Metal Climax, Inc., New York, N.Y., a corporation of New York
No Drawing. Filed June 11, 1962, Ser. No. 201,254
4 Claims. (Cl. 260—429)

This invention relates to organometallic compounds and more particularly to the molybdenum carboxylate compounds which are obtained from reacting molybdenum pentachloride with certain aromatic monocarboxylic acids. The invention additionally concerns the method of using such compounds to catalyze the polymerization of ethylenically unsaturated monomers.

The primary object of this invention is to provide a novel family of useful molybdenum carboxylate chloride compounds.

Another important object is to provide a practicable method for synthesizing and isolating molybdenum carboxylate chloride compounds.

A further object is to provide an organomolybdenum catalyst for use in the polymerization of ethylenically unsaturated hydrocarbons.

The compounds which are encompassed by this invention are the molybdenum carboxylate chlorides having the following formula:

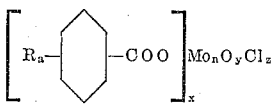

in which is $a$ 1–5, R is a radical selected from the group consisting of alkyl radicals having 1–10 carbon atoms, halogen substituted alkyl radicals having 1–10 carbon atoms, acyloxy radicals having 1–10 carbon atoms, alkoxy radicals having 1–10 carbon atoms, the nitro radical, the phenyl radical, halogen radicals and hydrogen, $x$ is 1–3, $y$ is 0–3, $z$ is 1–4 and $n$ is 1–3. The preferred compounds within the above general formula are those compounds represented by the formula when $x$ is 2, $y$ is 0, $n$ is 1 and $z$ is 3, that is the molybdenum trichloride dibenzoates having the formula:

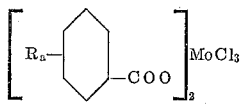

in which R is a radical selected from the group consisting of alkyl radicals having 1–10 carbon atoms, halogen substituted alkyl radicals having 1–10 carbon atoms, acyloxy radicals having 1–10 carbon atoms, alkoxy radicals having 1–10 carbon atoms, the nitro radical, the phenyl radical, halide radicals and hydrogen.

In the above formulas the attachment lines between the R group and the COO group and the benzene ring are shown between the normal positions on the ring, and are intended to indicate that these groups can occupy any of the available positions on the ring.

In accordance with this invention it has been found that molybdenum pentachloride is specifically reactive with benzene monocarboxylic acids and substituted benzene monocarboxylic acids and capable of producing the compounds encompassed by the above general formula when the reaction is effected in a non-polar solvent or a solvent substantially free of active hydrogen. In such a solvent the admixture of molybdenum pentachloride and the selected benzene monocarboxylic acid react, with agitation, at temperatures from room temperature up to a temperature approaching the decomposition temperature of molybdenum trichloride dibenzoate, namely 210° C. to 220° C. to form the molybdenum benzene carboxylate chlorides of this invention. The rate of reaction is undesirably low at room temperature and it is preferred that the reaction be carried out at a temperature above about 60° C.

The benzene monocarboxylic acids which are reactive with molybdenum pentachloride under the conditions above given include benzoic acid and benzoic acids substituted on the ring with 1–5 alkyl radicals having 1–10 carbon atoms, 1–5 halogen-substituted alkyl radicals having 1–10 carbon atoms, 1–5 alkoxy or acyloxy radicals having 1–10 carbon atoms, 1–5 nitro radicals, 1–5 phenyl radicals, 1–5 halogen radicals and hydrogen. In all cases, the lower carbon chain length substituents, for example, 1–4 carbon atoms, represent more important and commercially available reactant acids and for these reasons constitute a preferred group.

The halogen substituent on the ring or in the halogen-substituted alkyl radicals is preferably chlorine, and when R is a halogen, $a$ is preferably 1–3. When R is phenyl, $a$ is preferably 1. Examples of specific acids which are representative of the above groups and which represent preferred reactants include methyl benzoic acid, ethyl benzoic acid, pentamethyl benzoic acid, nitro benzoic acid, chloro-methyl benzoic acid, chloro-benzoic acid, 2,5 dichloro-benzoic acid, benzotrichloride, fluoro-benzoic acid, p-methoxy benzoic acid, ethoxy benzoic acid, trimethoxy benzoic acid, acetyl salicylic acid, nitro-benzoic acid, etc.

The reaction is satisfactorily effected in non-polar solvents or solvents which do not contain an active hydrogen and which are only partial solvents for, and preferably non-solvents for, the compounds of this invention. Available solvents which meet these requirements include carbon tetrachloride, benzene, nitrobenzene, toluene, n-hexane, ethylene dichloride, and perchloroethane, and of this group benzene, carbon tetrachloride and nitrobenzene constitute a preferred sub-group.

The molybdenum chloride benzoates of this invention are formed by admixing and thereafter agitating molybdenum pentachloride and the selected benzoic acid, in one of the above described solvents, for example benzene, preferably raising the temperature to about 60° C. and maintaining this or a higher temperature for a time sufficient to form the desired compound and thereafter separating the compound from the reacting medium. The time which is required has been found to vary from about 3 to 4 hours at the reflux temperature of benzene to form the molybdenum trichloride dibenzoates up to about 120 hours, or longer, to form dimolybdenum dioxychloride tribenzoate.

Two of the chlorine atoms of molybdenum pentachloride are relatively easily replaced with the carboxylate radical. All that is necessary to effect this reaction is to provide the stoichiometric proportions of 2 mols of benzoic acid to 1 mol of molybdenum pentachloride and upon agitation, preferably above 60° C. the reaction begins to occur. Increasing the time of the reaction under these conditions, merely increases the yield. In order to remove others of the remaining three chlorine atoms of the molybdenum pentachloride it is necessary to substantially extend the reaction time and it is advantageous to increase the temperature appreciably above 60° C. and to carry out the reaction in the presence of an excess of the selected benzoic acid reactant. A convenient method for accomplishing this result is to select a solvent having a relatively high refluxing temperature but preferably appreciably below the decomposition temperature of the compounds of this invention, namely 210° C.–220° C., for example, a reflux temperature in the range of 85° C.–120° C. Under such conditions a total of four of the chlorine atoms of the molybdenum pentachloride can be replaced and the latter two chlorines are replaced with oxygen or another carboxylate group. Although the reaction mechanism is not completely understood, the reaction apparently occurs in two stages, the first of which involves the formation of a molybdenum coordination product and the second of which involves the conversion of this coordination product, with concurrent replacement of chlorine, into the compounds of this invention. The first stage product has a bright green color while the compounds of this invention are less bright and have a lighter green color. In the presence of excess benzoic acid reactant, the initial compound of this invention which if formed is molybdenum trichloride dibenzoate and as refluxing is continued, a condensation or partial polymerization of the dibenzoate occurs, and possibly simultaneously with the formation of molybdenum dichloride tribenzoate, to ultimately form dimolybdenum dioxychloride tribenzoate. When the quantity of the benzoic acid reactant which is present is less than 5 mols of benzoic acid to 1 mol of molybdenum pentachloride or the reaction time is too short, a compound is formed containing less chlorine and more oxygen, or less chlorine and more benzoate, or less chlorine and more oxygen and more benzoate than is present in molybdenum trichloride dibenzoate, but intermediate to the amounts of chlorine, oxygen and benzoate which are present in dimolybdenum dioxychloride tribenzoate. Moreover a series of such compounds are formed and each such intermediate compound functionally serves as a starting material which with additional benzoic acid reactant corresponding to that used in its formation and additional reaction time will form dimolybdenum dioxychloride tribenzoate.

When the proportion of benzoic acid reactant to molybdenum pentachloride is 1 to 1, in benzene, molybdenum monobenzoate tetrachloride is formed and upon continued reaction a condensation occurs to produce molybdenum oxytrichloride benzophenone and this condensation mechanism is comparable to a Friedel-Crafts condensation. Using a 1 to 1 proportion of benzoic acid to molybdenum pentachloride in toluene and refluxing for 17 hours produced molybdenum oxytrichloride 4-methyl benzophenone. In the presence of more than 2 mols of the benzoic acid reactant for each mol of molybdenum pentachloride the benzophenone condensation does not occur, and the product is entirely molybdenum trichloride dibenzoate or is an admixture of molybdenum trichloride dibenzoate and one or more of the above mentioned intermediates, or entirely one of the intermediates depending upon the reaction time and temperature and the degree of excess concentration of the benzoic acid reactant.

The compounds of this invention are all green crystalline solids, and although the shade of green varies slightly it is most aptly described as a light green. The compounds can be separated from the reacting medium by filtration using conventional techniques, for example, by vacuum filtration through a sintered glass filter tube. All of the compounds except the dimolybdenum dioxychloride tribenzoate hydrolyze in the presence of moisture and for this reason the filtration step is preferably performed in a dry atmosphere. The hygroscopicity of the compounds of this invention appears to decrease as the condensation or polymerization increases, for example, molybdenum trichloride dibenzoate and molybdenum oxytrichloride benzophenone are immediately hydrolyzed with water whereas the intermediate condensation compound resulting from refluxing 3 mols of benzoic acid and 1 mol of molybdenum pentachloride in benzene for 5 days hydrolyzes in water more slowly and dimolybdenum dioxychloride tribenzoate is not hydrolyzed to any discernible extent. The compounds of this invention react with alcohols to give the corresponding ester, and undergo a condensation comparable to a Friedel-Crafts condensation to yield the corresponding ketone. The compounds have been found to be useful as catalysts in the polymerization of ethylenically unsaturated hydrocarbons, for example, styrene. They are also useful as co-catalysts in the low pressure polymerization of ethylene and propylene, such co-catalysts being the alkyl metal compounds of groups 1A, 2A and 3A of the periodic table and specifically including alkyl compounds of lithium, magnesium, calcium, boron and aluminum.

The examples which follow illustrate in greater detail typically suitable operating conditions, proportions of reactants and procedures for separating the compounds of this invention as well as product characteristics, but it is to be understood that they are illustrative only and do not contain the defining limits of this invention which have been given hereinabove. All experiments were conducted under a dry nitrogen atmosphere and all material transferals were accomplished in a dry box.

*Example I*

33.7 grams of benzoic acid was admixed with 500 ml. of carbon tetrachloride and 37.5 grams of molybdenum pentachloride was added thereto, with stirring for a 10 minute period. A green solid was immediately formed with no noticeable heat generation. The reaction mixture was then refluxed for 16 hours and hydrogen chloride was continuously evolved. After cooling to room temperature, a finely crystalline solid was separated by vacuum filtration through a sintered glass filter tube. The separated solid was vacuum dried overnight at room temperature to obtain 57.2 grams of a light green solid, thus giving a yield of 93.3%. A melting point determination was made and the melting point of 210° C.–220° C. was established and hydrogen chloride was evolved at the melting temperature. Upon exposure to the atmosphere, the product turned brown, and the pungent odor of benzoyl chloride was apparent. The solid product was found to be more than 2% soluble in acetone and ethanol to give dark brown solutions.

The product is insoluble in water and immediately hydrolyzes to benzoic acid. The product is soluble in an ethanol-water solvent pair. It is also more than 2% soluble in ethyl acetate to produce dark-green solutions. The product is only slightly soluble in diethyl ether to give a light green solution, and is completely insoluble in carbon disulfide, carbon tetrachloride and petroleum ether. When the product is refluxed in benzene, at room temperature for an extended period benzophenone is produced.

A proportion of the product was analyzed and found to contain 37.03% carbon, 2.30% hydrogen, 23.8% chlorine and 20.8% molybdenum, and this analysis corresponds to a compound having the formula $C_{14}H_{10}Cl_3MoO_4$, within the limits of analytical error.

Styrene monomer, inhibited to resist polymerization at normal room temperature, was slowly added to a container containing a portion of the molybdenum trichloride dibenzoate product, prepared above, until the molybdenum trichloride dibenzoate represented 1.1% by weight of the total reaction mixture, and the mass was agitated for 30 minutes and thereafter allowed to stand for 20 hours at 20° C.–24° C. At the end of this period the polymerization mixtures were extracted with hot toluene and precipitated with excess methanol to obtain the higher molecular weight fraction. The precipitated polymers were then separated by filtration through fritted glass, Gooch-type crucibles. The separated polymer was then vacuum dried to constant weight, first at room temperature and thereafter in an oven at 60° C. and 10 mm. of mercury pressure. The precipitated polymer was in the form of a viscous mass and represented a 37.8% yield based on the original styrene monomer weight. The softening point of the polymer was determined to be 77° C.–78° C. and the melting range was found to be 100° C.–110° C.

*Example II*

104 grams of benzoic acid was admixed in 500 ml. of benzene with 46.5 grams of molybdenum pentachloride, with stirring, over a 25 minute period without rise in the reaction temperature. The reaction mixture was refluxed for 5 days and at the end of this time there was no further detectable evolution of hydrogen chloride. A light green crystalline product was separated by filtration in air. No benzoyl chloride was detected in the reaction mixture filtrate by vacuum distillation. The reaction mixture filtrate was found to consist entirely of benzoic acid and to be free from benzophenone. The crystalline product was washed successively with benzene, diethyl ether, methanol and water and there was no observable reaction with any of these solvents. The product was then dried by successive methanol and ether washings and 56 grams of product were recovered, representing 100% yield.

A proportion of the product was analyzed and found to contain 39.50% carbon, 2.40% hydrogen, 5.70% chlorine and 29.77% molybdenum and this analysis corresponds to a composition having a formula $$C_{21}H_{15}ClMo_2O_8$$

which is the equivalent of $(C_6H_5COO)_3Mo_2O_2Cl$. The green crystalline product is completely non-hydroscopic and resists attack by nitric and hydrochloric acids. The product is completely soluble in aqueous sulfuric acid at a concentration greater than 79% by weight to release benzoic acid. The product required refluxing for several hours with 10% aqueous sodium hydroxide in order to effect saponification. The product is insoluble in common organic solvents except chloroform and pyridine with which it reacts to replace benzoate. The product thermally decomposes above 300° C. without melting.

A mixture of 10 grams of the product and 50 ml. of pyridine was refluxed for 1½ hours. The reaction mixture was vacuum evaporated and the residue was treated with aqueous hydrochloric acid to remove unreacted pyridine. An orange-brown solid product was formed and was washed successively with water, methanol and diethyl ether and 2.34 grams of benzoic acid was isolated from the combined organic extracts. The product was then extracted in a Soxhlet apparatus to obtain a small amount of yellow-orange solid. A proportion of the yellow-orange was analyzed and found to contain 37.53% carbon, 2.62% hydrogen, 32.13% molybdenum and 2.25% nitrogen, and this analysis corresponds to a compound having the formula $(C_6H_5COO)_2Mo_2O_6(C_5H_5N)$, within the normal limits of analytical error. The product was slightly soluble in chloroform but was insoluble in water and ethanol.

*Example III*

A mixture of 6.85 grams of molybdenum trichloride dibenzoate, prepared as in Example I, and 5.73 grams of benzoic acid in 50 ml. of benzene was refluxed for 5 days. At the end of 5 days a green crystalline product was separated by filtration in air. The reaction mixture filtrate was vacuum distilled and no benzoyl chloride or benzophenone was detected. The green crystalline solid was treated with water and no hydrolysis occurred. It was washed successively with methanol and diethyl ether and further dried by infrared lamp heat to obtain 4.62 grams of product. A proportion of the product was analyzed and found to contain 39.88% carbon, 2.43% hydrogen, 5.63% chlorine and 30.2% molybdenum, and this analysis corresponds to a compound having the formula $C_{21}H_{15}ClMo_2O_8$, within the normal limits of analytical error.

The infrared spectrum and X-ray diffraction pattern of the product was taken and found to be identical with the infrared spectrum and X-ray diffraction pattern of the product which was prepared in Example II.

*Example IV*

21.9 grams of benzoic acid was dissolved in 500 ml. of benzene and 48.75 grams of molybdenum pentachloride was added thereto, with stirring, over an 8 minute period. The reaction mixture was refluxed for 5 days without cessation of hydrogen chloride evolution. The reaction mixture was concentrated by distillation of 300 ml. benzene, and hydrogen chloride was noted to be evolved during this distillation. The reaction mixture was refluxed for an additional 8 hours and hydrogen chloride was still evolving. The refluxing was stopped and the mixture cooled to room temperature and thereafter briefly refrigerated. A finely crystalline, light green solid was separated from the reaction mixture by filtration and washed with benzene. It was noted that the product had an appreciable benzene solubility. The separated product was vacuum dried and 50.6 grams were isolated, giving a 70% yield.

A portion of the product was analyzed and found to contain 38.09% carbon, 2.52% hydrogen, 26.42% chlorine and 24.03% molybdenum, and this analysis corresponds to a compound having the formula $$C_{13}H_{10}Cl_3MoO_2$$

within the normal limits of analytical error.

A portion of the product was treated with water and immediate hydrolysis occurred yielding benzophenone. A portion of the benzophenone was isolated and the boiling point was found to be 108° C.–109° C.

Styrene monomer, inhibited to resist polymerization at normal room temperature, was slowly added to a container containing a portion of the molybdenum oxytrichloride benzophenone product, prepared above, until the molybdenum dibenzoate trichloride benzophenone represented 1.35% by weight of the total reaction mixture, and the mass was agitated for 30 minutes and thereafter allowed to stand for 20 hours at 20° C.–24° C. At the end of this period the polymerization mixtures were extracted with hot toluene and precipitated with excess methanol to obtain the higher molecular weight fraction. The precipitated polymers were then separated by filtration through fritted glass, Gooch-type crucibles. The separated polymer was then vacuum dried to constant weight, first at room temperature and thereafter in an oven at 60° C. and 10 mm. of mercury pressure. The precipitated polymer was in the form of a viscous mass and represented a 32.4% yield based on the original styrene monomer weight. The melting range of the polymer was found to be 60° C.–70° C.

*Example V*

22.7 grams of benzoic acid was admixed with 500 ml. of toluene and to this mixture 50.8 grams of molybdenum pentachloride was added, with stirring, over an 8 minute period. A slight exothermic reaction occurred giving a brown solution and considerable evolution of hydrogen chloride. The reaction mixture was refluxed for 17 hours to form a fine crystalline solid, which was molybdenum oxytrichloride 4-methylbenzophenone. The crystalline solid was stirred into 500 ml. of 10% hydrochloric acid and formed a gelatinous, inorganic hydrolysis product which was difficult to separate by filtration. The aqueous acid layer was saturated with ammonium chloride, which increased the filtration rate and the aqueous layer was separated and extracted with ether. The combined ether extract and toluene solution was washed with water, treated wih Drierite, and distilled to strip off the organic solvents. The pot residue was dissolved in ether, and this solution was extracted with 10% aqueous sodium hydroxide. From this alkali extract, after acidification, 0.3 gram of benzoic acid was obtained. The non-alkali extracted organic product was fractionally distilled through a Vigreaux column yielding only one fraction and 26 grams of product was recovered. The boiling point of the fraction was found to be 103° C.–105° C., and the melting point was 55° C.–57° C. The product was identified as 4-methylbenzophenone, by its 2,4-dinitrophenylhydrazone, melting point of 200° C.–201° C.

*Example VI*

7.93 grams of molybdenum trichloride dibenzoate was added to 50 ml. of methanol with complete and exothermic solvolysis. The resulting dark-brown solution was refluxed for three hours. The reaction mixture was shaken with a large excess of water, saturated with sodium chloride, and extracted with two volumes of diethyl ether. This extract was washed successively with concentrated, aqueous sodium bicarbonate and water. After treatment with Drierite, the extract was fractionated through a Vigreaux column to give 3.76 grams of methyl benzoate. The boiling point of the fractionated material was determined to be 68° C.

*Example VII*

60 grams of benzoic acid was admixed with 500 ml. of benzene and 44.7 grams of molybdenum pentachloride was quickly added, with stirring. There was rapid formation of a bright green solid. The reaction mixture was refluxed for 5 days. The solid reaction product was separated by vacuum filtration through a fritted-glass filter tube. After washing with benzene, the solid was vacuum dried at room temperature to obtain 63.3 grams darkgreen, crystalline solid. Upon exposure to air, the product slowly turned brown and evolved hydrogen chloride. Some minutes exposure to water was required for appreciable hydrolysis. A portion of the product was analyzed and found to contain 38.15% carbon, 2.32% hydrogen, 20.4% chlorine and 23.14% molybdenum, and this analysis corresponds to a compound having the formula $(C_6H_5COO)_{1.9}MoO_{0.3}Cl_{2.4}$. The compound had a melting point of 220° C.–221° C. and at this temperature the evolution of hydrogen chloride was evident.

This application is a division of copending application Serial No. 803,590, filed April 2, 1959, now Patent No. 3,042,694.

What is claimed is:
1. Molybdenum oxytrichloride benzophenone.
2. Molybdenum oxytrichloride 4-methylbenzophenone.
3. A method for making molybdenum oxytrichloride benzophenone which comprises the step of refluxing molybdenum pentachloride and benzoic acid in benzene, said molybdenum pentachloride and said benzoic acid being present in a molar ratio of about 1:1 and continuing said refluxing until said compound is formed.
4. A method for forming molybdenum oxytrichloride 4-methylbenzophenone which comprises the step of refluxing molybdenum pentachloride and benzoic acid in toluene, said molybdenum pentachloride and said benzoic acid being present in about a 1:1 molar ratio and continuing said refluxing until said compound is formed.

No references cited.